United States Patent
Choi et al.

(10) Patent No.: US 10,671,116 B2
(45) Date of Patent: Jun. 2, 2020

(54) TOUCH PANEL AND TOUCH SCREEN PANEL HAVING THE SAME

(71) Applicant: Samsung Display Co., Ltd., Yongin-Si, Gyeonggi-Do (KR)

(72) Inventors: Sangkyu Choi, Hwaseong-si (KR); Jae-wook Kang, Hwaseong-si (KR); Hanyung Jung, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/557,901

(22) Filed: Aug. 30, 2019

(65) Prior Publication Data

US 2019/0384357 A1 Dec. 19, 2019

Related U.S. Application Data

(63) Continuation of application No. 15/411,660, filed on Jan. 20, 2017, now Pat. No. 10,401,903.

(30) Foreign Application Priority Data

Jan. 27, 2016 (KR) .......................... 10-2016-0010198

(51) Int. Cl.
*G06F 1/16* (2006.01)
*G06F 3/041* (2006.01)
*G06F 3/044* (2006.01)

(52) U.S. Cl.
CPC .......... *G06F 1/1616* (2013.01); *G06F 1/1652* (2013.01); *G06F 3/044* (2013.01); *G06F 3/0416* (2013.01); *G06F 2203/04102* (2013.01)

(58) Field of Classification Search
CPC ...... G06F 1/1616; G06F 3/044; G06F 3/0416; G06F 1/1652; G06F 2203/04102
See application file for complete search history.

(56) References Cited

U.S. PATENT DOCUMENTS

| | | | |
|---|---|---|---|
| 8,716,932 B2 | 5/2014 | Rappoport et al. | |
| 9,122,088 B2 * | 9/2015 | Omote | G06F 3/044 |
| 2014/0049500 A1 * | 2/2014 | Chen | G06F 3/0412 |
| | | | 345/174 |
| 2015/0090044 A1 * | 4/2015 | Hwang | G06F 1/1652 |
| | | | 73/779 |

FOREIGN PATENT DOCUMENTS

| | | |
|---|---|---|
| JP | 5113960 B2 | 10/2012 |
| KR | 10-2014-0064259 A | 5/2014 |
| KR | 10-2014-0099164 A | 8/2014 |
| KR | 10-2015-0009423 A | 1/2015 |
| KR | 10-2015-0009291 A | 2/2015 |
| KR | 10-2016-0145913 A | 12/2016 |

\* cited by examiner

*Primary Examiner* — Andrew Sasinowski
(74) *Attorney, Agent, or Firm* — Innovation Counsel LLP

(57) ABSTRACT

A touch panel includes: a base member having a folding axis which extends in a first direction, a folding area including the folding axis, and a non-folding area adjacent to the folding area; a touch cell which senses an external touch signal, and at least a part of which overlaps the folding area; a pad disposed on the base member, and disposed to be spaced apart from the touch cell when viewed in a plane; and a first driving wiring having a first part and a second part, wherein at least the first part extends in a diagonal direction with respect to a direction in which the folding axis extends, and which connects the pad and the touch cell. At least a part which extends in the diagonal direction overlaps the folding area.

19 Claims, 14 Drawing Sheets

TOUCH PANEL AND TOUCH SCREEN PANEL HAVING THE SAME

CROSS-REFERENCE TO RELATED APPLICATIONS

This application is a continuation application of U.S. patent application Ser. No. 15/411,660 filed Jan. 20, 2017, which claims priority to and the benefit of Korean Patent Application No. 10-2016-0010198 filed on Jan. 27, 2016, in the Korean Intellectual Property Office, the disclosure of which is incorporated herein in its entirety by reference.

BACKGROUND

The present disclosure herein relates to a touch panel and a touch screen panel having the same, and more particularly, to a foldable touch panel and a touch screen panel having the same.

A display device provides information to a user by displaying various images on a display screen. Currently, foldable display devices that incorporate flexible display members are being developed. In addition, a state-of-the-art display device may include a display member and a touch member. Accordingly, the touch member may also be folded corresponding to the display member.

The touch member inputs information by acquiring coordinate information of a point at which a touch event has occurred. The display member is connected to the touch member to be capable of displaying an image corresponding to the information inputted from the touch member.

A foldable display device, unlike a flat panel display device, may be folded, rolled, or bent like paper. Due to the fact that the shape of the foldable display device may be changed variously, this type of device may be easy to carry and convenient for a user.

SUMMARY

The present disclosure provides a touch panel with improved reliability and a touch screen panel having the same.

An embodiment of the inventive concept provides a touch panel which includes: a base member having a folding axis which extends in a first direction, a folding area including the folding axis, and a non-folding area adjacent to the folding area; a touch cell which senses an external touch signal, and at least a part of which overlaps the folding area; a pad disposed on the base member, and disposed to be spaced apart from the touch cell when viewed in a plane; and a first driving wiring having a first part and a second part, wherein at least the first part extends in a diagonal direction with respect to the first direction, the first driving wiring overlapping the folding area, and connecting the pad and the touch cell.

In an embodiment, the pad may be disposed in the non-folding area.

In an embodiment, the first part of the first driving wiring may be disposed in the folding area, and the second part may be connected to the first part, and disposed in the non-folding area.

In an embodiment, an angle formed by the first part and the second part may be greater than 90 degrees.

In an embodiment, the first part may be inclined with respect to the first direction at an angle that is no greater than 45 degrees.

In an embodiment, the second part may include: a first section connected to the first part, and configured to extend in a diagonal direction with respect to the first direction; and a second section configured to connect the first section and the pad, and to extend in the first direction.

In an embodiment, the first section may extend in the same direction as that in which the first part extends.

In an embodiment, the touch panel may further include a second driving wiring connected to the touch cell, and disposed in the non-folding area, wherein the second driving wiring may overlap the non-folding area.

In an embodiment, the pad, the first driving wiring, and the second driving wiring may each be provided in plurality, the plurality of first driving wirings and the plurality of second driving wirings may each be connected to a corresponding pad of the plurality of pads, and the plurality of pads may overlap the non-folding area.

In an embodiment, each of the plurality of second driving wirings may include: a first part connected to the touch cell; a second part connected to the first part; and a third part configured to connect a corresponding pad of the plurality of pads and the second part, wherein one of the first part and the second part may be parallel to the folding axis, and the first part and the second part may be perpendicular to each other.

In an embodiment, the touch cell may include: a plurality of first electrodes configured to each extend in the first direction, and arranged in a second direction crossing the first direction; and a plurality of second electrodes that crosses the plurality of first electrodes at crossing points, the second electrodes being electrically insulated from the first electrodes at the crossing points, wherein each of the plurality of first driving wirings may be connected to a corresponding electrode of the plurality of first electrodes, and each of the plurality of second driving wirings may be connected to a corresponding electrode among the plurality of first electrodes and the plurality of second electrodes.

In an embodiment, each of the plurality of second driving wirings may be disposed on the same layer.

In an embodiment, second driving wirings connected to the plurality of first electrodes, and second driving wirings connected to the plurality of second electrodes, among the plurality of second driving wirings, may be disposed on different layers from each other.

An embodiment of the inventive concept provides a display device which includes: a display panel which includes a plurality of pixels, and is divided into a folding area which is folded about a folding axis defined in a first direction, and a non-folding area adjacent to the folding area, when viewed in a plane defined by the first direction and a second direction crossing the first direction; and a touch member disposed on the display panel and configured to sense an external touch input, wherein the touch member may be one of touch members to be described in detail.

In an embodiment, the display panel may further include an encapsulation layer disposed on the plurality of pixels, wherein at least one of the plurality of first electrodes and the plurality of second electrodes may be directly disposed on the encapsulation layer.

In an embodiment, the display panel may further include an insulation substrate disposed on the plurality of pixels, wherein at least one of the plurality of first electrodes and the plurality of second electrodes may be directly disposed on the insulation substrate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to describe principles of the inventive concept. In the drawings.

DETAILED DESCRIPTION

Hereinafter, exemplary embodiments of the inventive concept will be described in more detail with reference to the accompanying drawings.

Figure 1A:
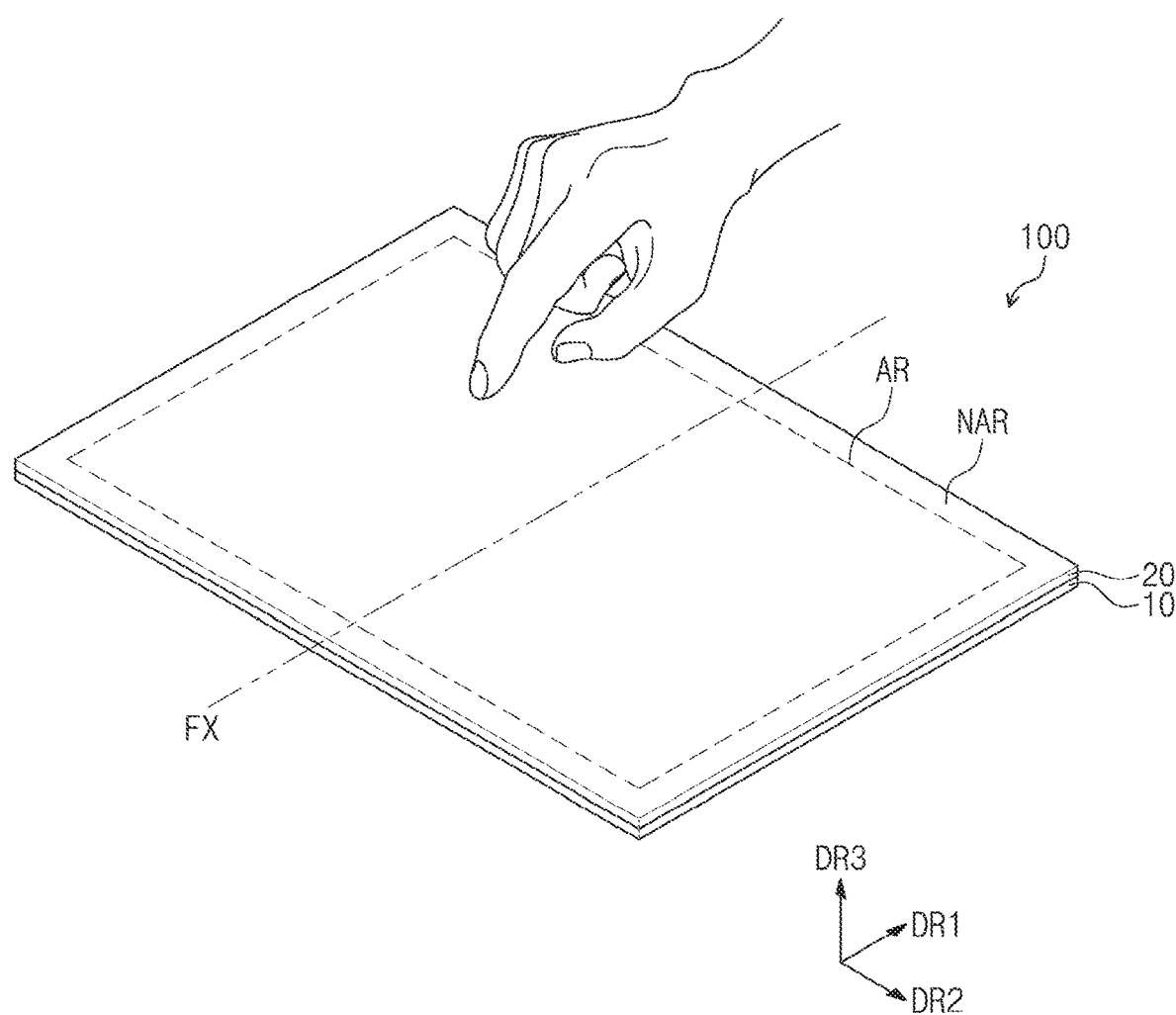
FIGS. 1A, 1B, and 1C are perspective views illustrating a touch panel according to an embodiment of the inventive concept.
Figure 1B:
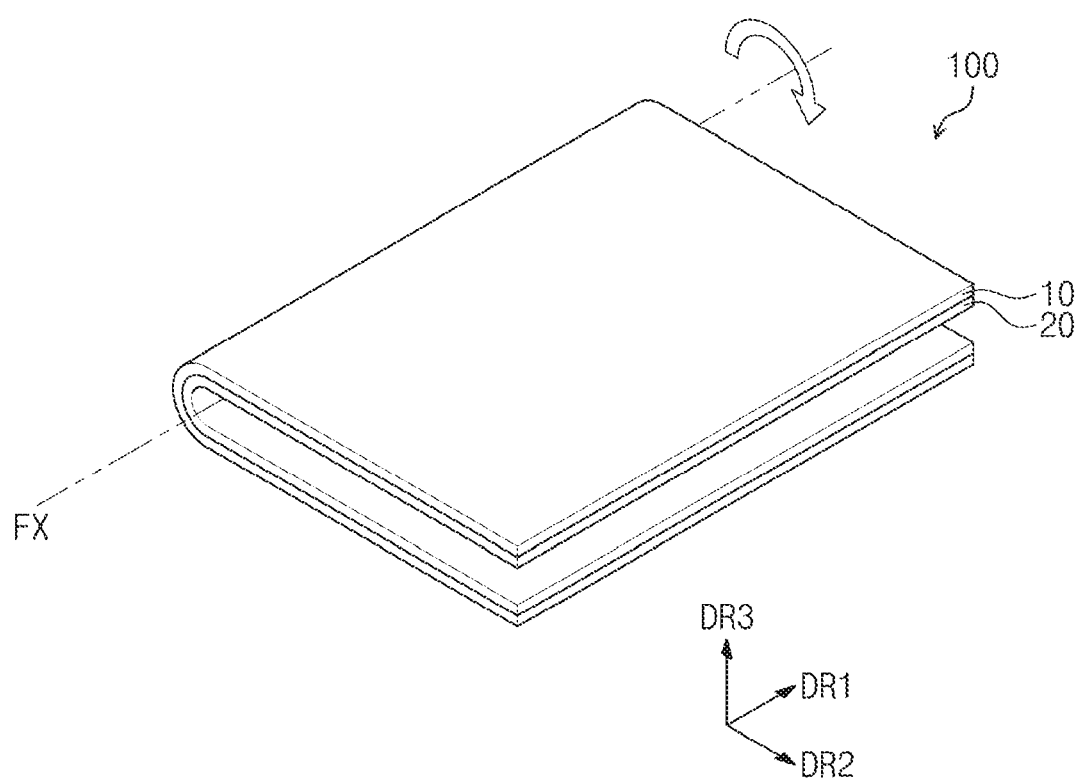
Figure 1C:
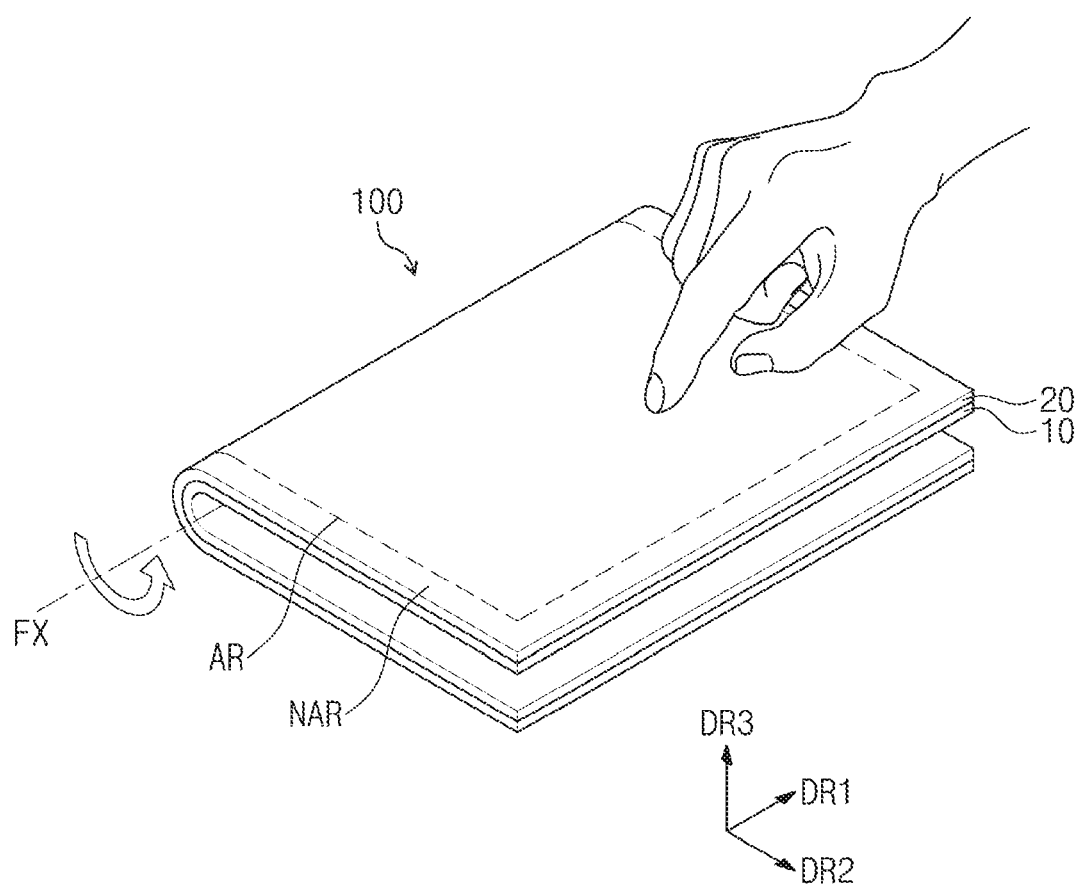
Figure 2A:
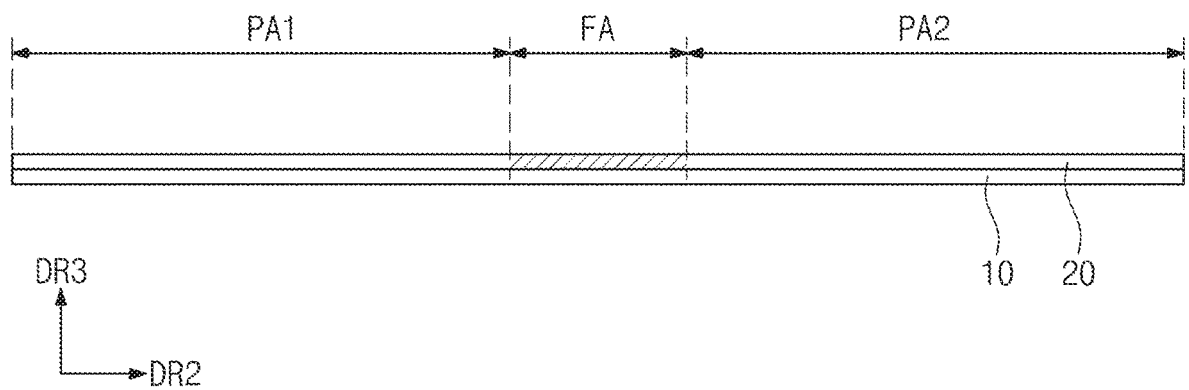
FIGS. 2A, 2B, and 2C are side views illustrating the touch panel according to an embodiment of the inventive concept.
Figure 2B:
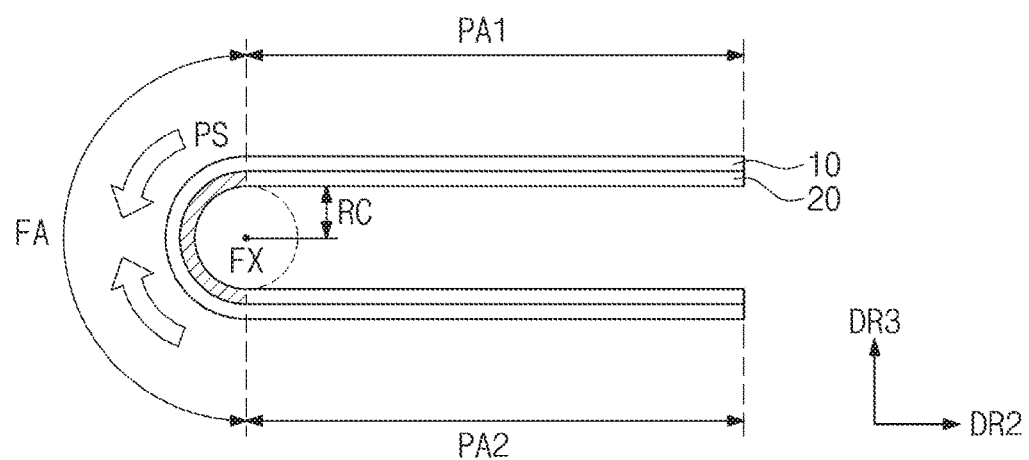
Figure 2C:
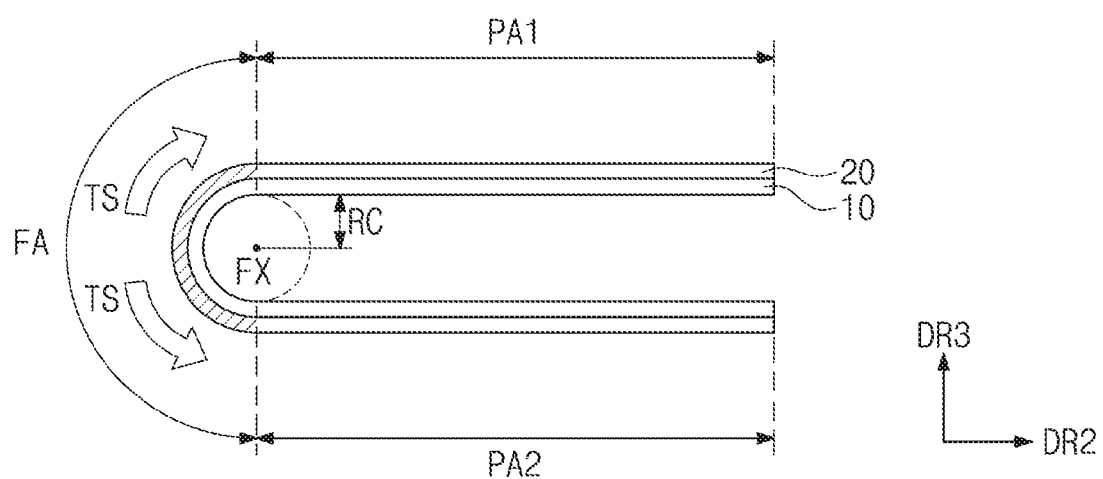

FIGS. 1A to 1C are perspective views illustrating a touch panel according to an embodiment of the inventive concept. FIGS. 2A to 2C are side views illustrating the touch panel according to an embodiment of the inventive concept.

FIG. 1A illustrates a touch panel 100 in a planar mode, FIG. 1B illustrates the touch panel 100 in a first folding mode, and FIG. 1C illustrates the touch panel 100 in a second folding mode. For ease of description, FIGS. 2A to 2C illustrate the side views in modes corresponding respectively to FIGS. 1A to 1C. Hereinafter, the touch panel 100 according to an embodiment of the inventive concept is described referring to FIGS. 1A to 2C.

The touch panel 100 includes a base member 10 and a touch member 20. The base member 10 may be a base layer on which the touch member 20 is disposed.

The base member 10 is electrically insulated from the touch member 20. For example, the base member 10 may be a panel having a plurality of insulation layers, or a single insulation substrate.

The touch member 20 senses an external touch signal provided to the touch panel 100. A touch signal may be provided in various types. FIGS. 1A and 1C illustrate an embodiment in which a touch signal inputted through a part of a user's body (for instance, a finger) is sensed.

Meanwhile, this is illustrated by way of example, and the touch signal provided to the touch member 20 is not limited to any one type. For example, the touch signal may be inputted in types such as an optical type, a touch type, and a magnetic type.

The touch member 20 may be divided into an active region AR and a non-active region NAR when viewed in a plane defined by a first direction DR1 and a second direction DR2. When a touch signal is applied to the active region AR, the touch member 20 may sense the touch signal and be activated in response.

The active region AR is defined in a central region of the touch member 20. In the active region AR, a touch cell to be described below may be disposed. The touch cell senses the touch signal provided to the touch member 20.

The touch member 20 may sense the touch signal in various types. For example, the touch member 20 may be driven in a capacitive type, a resistive type, or a coordinate recognition type, or the like. Meanwhile, this is described by way of example, and the touch member 20 may be driven in various types when the touch signal may be sensed, and is not limited to any one embodiment.

The non-active region NAR is adjacent to the active region AR. The non-active region NAR may surround the active region AR. In this embodiment, the non-active region NAR is shaped as a frame around the active region AR.

In the non-active region NAR, driving wirings and pads for applying electrical signals to the touch cell, or transmitting electrical signals the touch cell generates to the outside may be disposed. The touch cell, the driving wirings, and pads are described below.

The touch panel 100 may be folded or unfolded about a predetermined folding axis FX. The touch panel 100 may be divided into a plurality of regions, when viewed in a plane, in the second direction DR2 perpendicular to the folding axis FX.

As illustrated in embodiments of FIGS. 1A and 2A, the folding axis FX extends in the first direction DR1. Accordingly, the touch panel 100 may be divided into a first planar area PA1, a folding area FA, and a second planar area PA2 sequentially arranged in the second direction DR2 when viewed in a plane.

The folding area FA is an area including the folding axis FX. In the folding area FA, a folding stress may be experienced due to folding. Accordingly, deformation caused by the folding stress easily occurs in the folding area FA.

For ease of description in embodiments, an area overlapping the folding area FA in the touch member 20 is represented by shading in the figures.

The first and second planar areas PA1 and PA2 may be defined as the non-folding area. A folding stress is not experienced in each of the first and second planar areas PA1 and PA2. Accordingly, the deformation caused by the folding stress does not occur in each of the first and second planar areas PA1 and PA2.

Specifically, as illustrated in FIGS. 1B and 2B, the touch panel 100 is folded in the first folding mode such that the touch member 20 is disposed inside. In this case, the active region AR of the touch member 20 is not exposed to the outside. This first folding mode may herein be referred to as an in-folding mode.

In this case, a folding stress corresponding to a compressive stress PS may be applied to an area, in the touch member 20, overlapping the folding area FA. When the touch panel 100 is folded about the folding axis FX so as to have a predetermined radius of curvature RC, the touch member 20 disposed more inwardly compared to the base member 10 is disposed closer to the folding axis FX.

Accordingly, deformation caused by the compressive stress PS easily occurs to the touch member 20. A portion to which the compressive stress PS is applied is contractively deformed. A portion of the touch member 20 overlapping the folding area FA may cover less area in the first folding mode than in the planar mode.

On the contrary, as illustrated in FIGS. 1C and 2C, the touch panel 100 is folded in the second folding mode such that the touch member 20 is disposed outside. In this case, the active region AR of the touch member 20 may be exposed to the outside.

Accordingly, the touch panel 100 may sense a touch signal even while folded. The second folding node may herein be referred to as an out-folding mode.

In this case, a folding stress corresponding to a tensile stress TS may be applied to an area, in the touch member 20, overlapping the folding area FA. When the touch panel 100 is folded about the folding axis FX so as to have a radius of curvature RC described in detail, the touch member 20 disposed more outwardly compared to the base member 10 is disposed farther from the folding axis FX.

Accordingly, deformation caused by the tensile stress TS easily occurs to the touch member 20. A portion to which the tensile stress TS is applied may be expandably deformed. Accordingly, a portion, in the touch member 20, overlapping the folding area FA may have a larger area in the second folding mode than in the planar mode.

The touch member 20 relieves the folding stress applied to the touch member 20 by modifying a configuration of a portion corresponding to the folding area FA.

Meanwhile, the above illustrations are given by way of example, and the touch panel 100 may also operate in all of the planar mode, the first folding mode, and the second folding mode. In this case, the active region AR may be defined on both a top surface and a bottom surface of the touch member 20. The touch panel 100 may include various embodiments, and is not limited to any one embodiment.

Figure 3A:
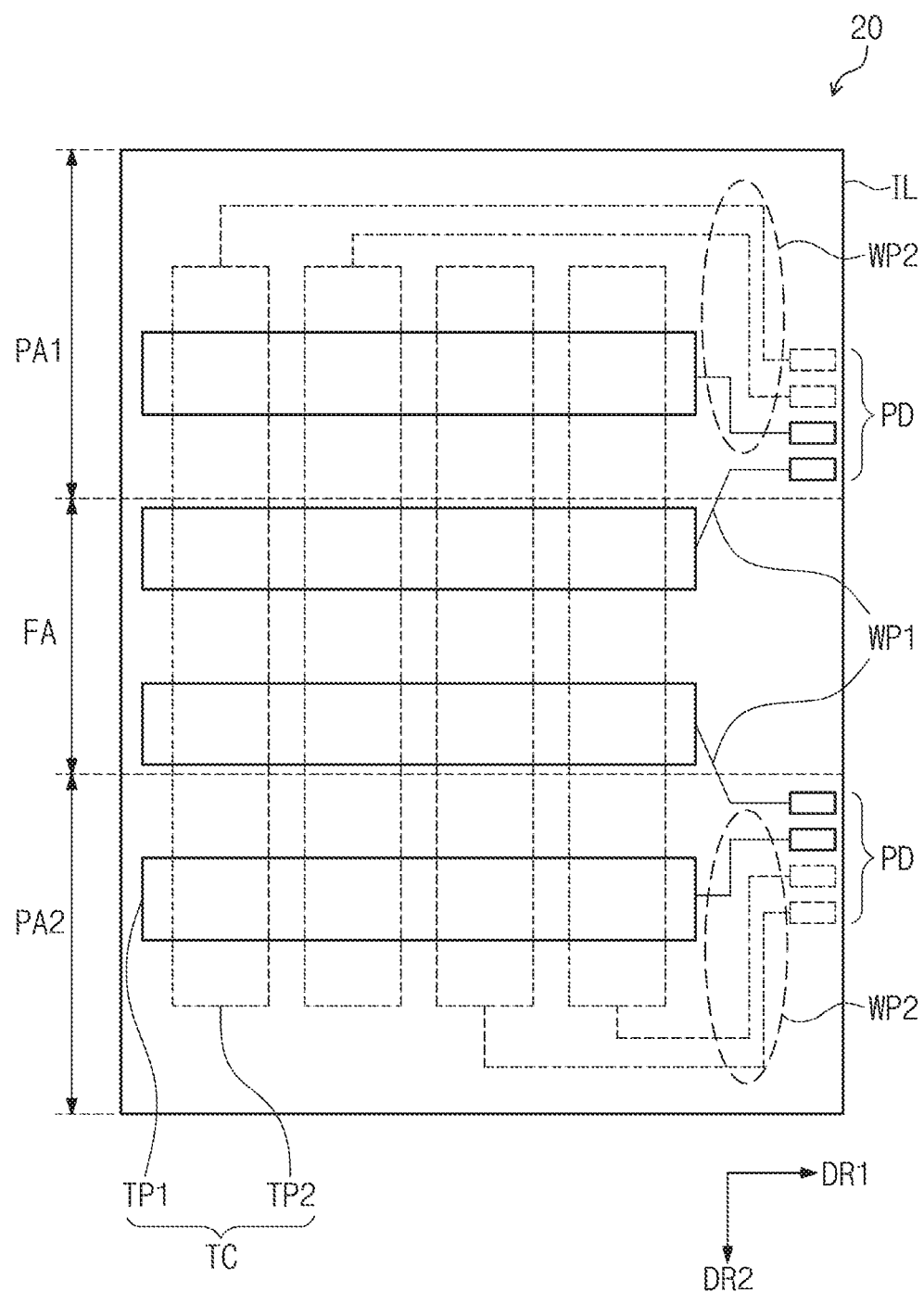
FIG. 3A is a plan view illustrating a touch panel according to an embodiment of the inventive concept.
Figure 3B:
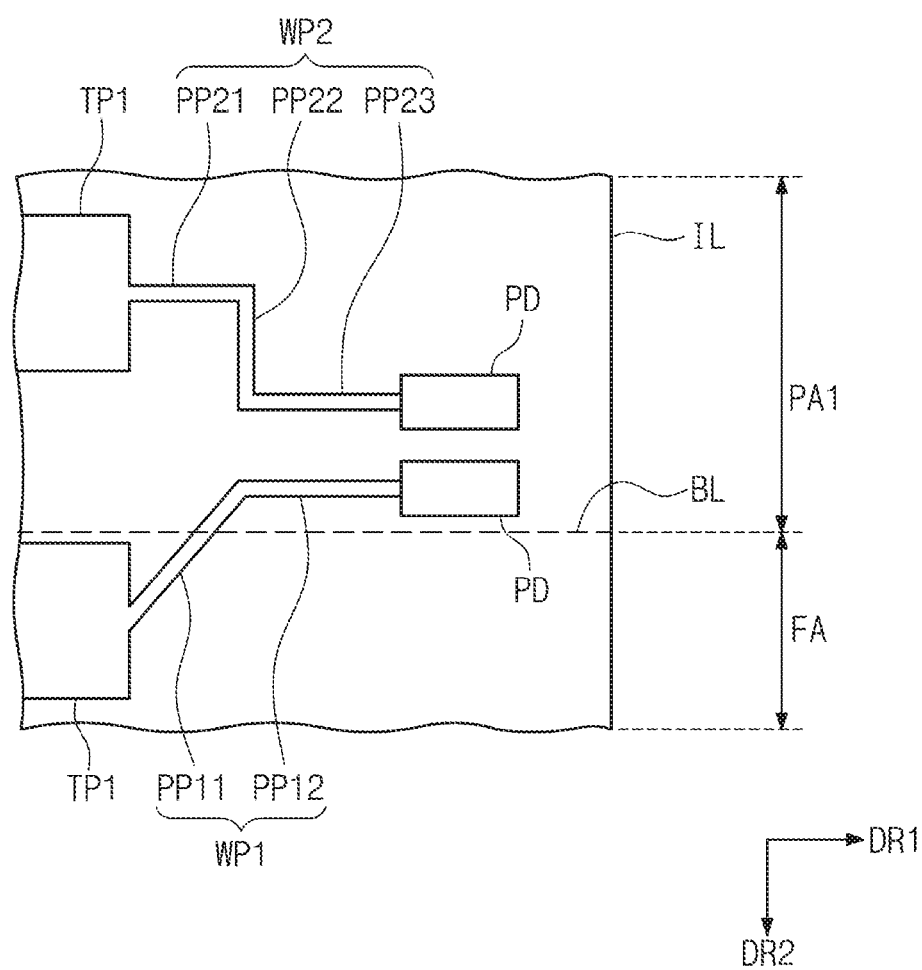
FIG. 3B is a partial plan view illustrating a portion of the touch panel illustrated in FIG. 3A.

FIG. 3A is a plan view illustrating a touch panel according to an embodiment of the inventive concept. FIG. 3B is a partial plan view illustrating a portion of the touch panel illustrated in FIG. 3A. FIGS. 3A and 3B substantially illustrate configurations of the touch member 20. Hereinafter, detailed description about the touch member 20 is given referring to FIGS. 3A and 3B.

The touch member 20 includes a touch cell TC, a plurality of driving wirings WP1 and WP2, and a pad PD. The touch cell TC is disposed in the active region AR. (Refer to FIG. 1A.) As described in detail, the touch cell TC senses an external touch signal.

The touch cell TC according to an embodiment of the inventive concept may have various structures. For example, the touch cell TC may have a capacitive type structure, a resistive type structure, or a coordinate recognition type structure. However, this is not an exhaustive list of examples, and the touch cell TC according to an embodiment of the inventive concept is not limited to any one embodiment.

In this specification, the touch cell TC having the capacitive type structure is described by way of example. The touch cell TC senses an external touch signal by detecting a region in which capacitance is changed.

At least a part of the touch cell TC overlaps the folding area FA. The touch cell TC includes a first electrode TP1 and a second electrode TP2. The first electrode TP1 and the second electrode TP2 face each other to form an electric field.

Each of the first electrode TP1 and the second electrode TP2 may be provided in plurality. The plurality of first electrodes TP1 each extend in the first direction DR1 and are arranged in the second direction DR2.

The plurality of second electrodes TP2 each extend in the second direction DR2 and are arranged in the first direction DR1. Each of the plurality of second electrodes insulatedly crosses each of the plurality of first electrodes.

The touch member 20 may further include an insulation layer IL. The insulation layer IL may be disposed between the first electrode TP1 and the second electrode TP2 on a cross section. The insulation layer IL insulates the first electrode TP1 and the second electrode TP2.

The pad PD is disposed in the non-active region NAR (Refer to FIG. 1A). The pad PD may be disposed so as to be adjacent to the end of the touch member 20.

The pad PD receives an electrical signal to be supplied to the touch cell TC from the outside. Or, the pad PD transmits an electrical signal the touch cell TC generates to the outside of the touch member 20.

The pad PD may be provided in plurality. The plurality of pads PD may correspond to each of the plurality of first electrodes and the plurality of second electrodes which constitute the touch cell TC.

The plurality of pads may be arranged in the second direction DR2. That is, the plurality of pads are arranged in a direction perpendicular to the folding axis FX.

The pad PD may be disposed in the non-folding area, which includes first planar area PA1 or the second planar area PA2 in the embodiment shown. The pad PD does not overlap the folding area FA. Accordingly, the pad PD may be free from influence by the folding stress.

The plurality of driving wirings WP1 and WP2 connect the touch cell TC and the plurality of pads PD. The touch cell TC receives electrical signals supplied from the plurality of pads PD through the plurality of driving wirings WP1 and WP2, or supplies electrical signals to the plurality of pads PD through the plurality of driving wirings WP1 and WP2.

The plurality of driving wirings WP1 and WP2 include at least one first driving wiring WP1 and at least one second driving wiring WP2. The first driving wiring WP1 and the second driving wiring WP2 respectively connect the touch cell TC to corresponding pads PD.

The first driving wiring WP1 may be connected to an electrode which, among the plurality of first electrodes TP1 and the plurality of second electrodes TP2, extends in a direction parallel to the folding axis FX. In this embodiment, the first driving wiring WP1 may be connected to any one of the plurality of first electrodes TP1 which extend in the first direction DR1.

In this embodiment, two first driving wirings are respectively connected to two of the plurality of first electrodes TP1. Meanwhile, this is illustrated by way of example, and the first driving wiring WP1 may be connected to an electrode which extends in various directions, and is not limited to any one embodiment.

At least a part of the first driving wiring WP1 overlaps the folding area FA. In FIG. 3B, the first driving wiring WP1 disposed in the first planar area PA1 and the folding area FA is illustrated by way of example.

Accordingly, the first driving wiring WP1 may overlap a border line BL which is a border between the folding area FA and the first planar area PAL The border line BL is defined to extend in a direction substantially the same as that in which the folding axis FX (refer to FIG. 1) extends.

The first driving wiring WP1 includes a first part PP11 and a second part PP12. The first part PP11 is disposed in the folding area FA. The first part PP11 may be directly connected to the touch cell TC.

The first part PP11 extends in a diagonal direction with respect to the first direction DR1. The diagonal direction crosses each of the first direction DR1 and the second direction DR2.

An angle formed by the first part PP11 and the border line BL may be larger than 0 degree and smaller than 90 degrees. In this embodiment, the border line BL extends in the same direction as the folding axis FX.

Meanwhile, the first part PP11 need only extend in a direction not perpendicular to the first direction DR1, and may have a single inclination, but may have partially different inclinations.

The second part PP12 connects the first part PP11 and the pad PD. The second part PP12 is disposed in order not to overlap the folding area. In this embodiment, the second part PP12 may be disposed in the first planar area PA1 or the second planar area PA2.

For a driving wiring disposed in the folding area FA, a folding stress applied to the driving wiring may increase as an angle formed by the driving wiring and the folding axis FX becomes larger.

The touch panel according to an embodiment of the inventive concept may minimize a folding stress applied to the first driving wiring WP1 even when the pad PD not overlapping the folding area FA and the first electrode TP1 overlapping the folding area FA are electrically connected, by disposing the first part PP11 in the folding area FA.

The second driving wiring WP2 is connected to one of the first electrode TP1 and the second electrode TP2. In FIG. 3B, the second driving wiring WP2 which is connected to the first electrode TP1 and disposed in the first planar area PA1 is illustrated on an enlarged scale.

The second driving wiring WP2 is disposed in order not to overlap the folding area FA. Accordingly, the second driving wiring WP2 may be disposed in the first planar area PA1 or the second planar area PA2.

The second driving wiring WP2 includes a first part PP21, a second part PP22, and a third part PP23. The first part PP21, the second part PP22, and the third part PP23 may be sequentially connected.

The first part PP21 is connected to the touch cell TC. The first part PP21 may be directly connected to the first electrode TP1. The first part PP21 extends in the first direction DR1.

The second part PP22 is connected to the first part PP21. The third part PP23 is connected to the second part PP22. The third part PP23 connects the second part PP22 and the pad PD.

One of the first part PP21 and the second part PP22 is parallel to the folding axis FX, and the first part PP21 and the second part PP22 are perpendicular to each other. In this embodiment, the first part PP21 of the second driving wiring WP2 may extend in the first direction DR1, and the second part PP22 may extend in the second direction DR2.

The second driving wiring WP2 may include the second part PP22 perpendicular to the folding axis FX, but does not overlap the folding area FA. Accordingly, the second part PP22 may be free from influence by the folding stress.

The touch panel 100 according to an embodiment of the inventive concept may alleviate damage caused by the folding stress and provide a foldable touch panel with improved reliability by separately disposing the first driving wiring WP1 and the second driving wiring WP2 according to whether the folding stress is applied to an area or not.

Figure 4:
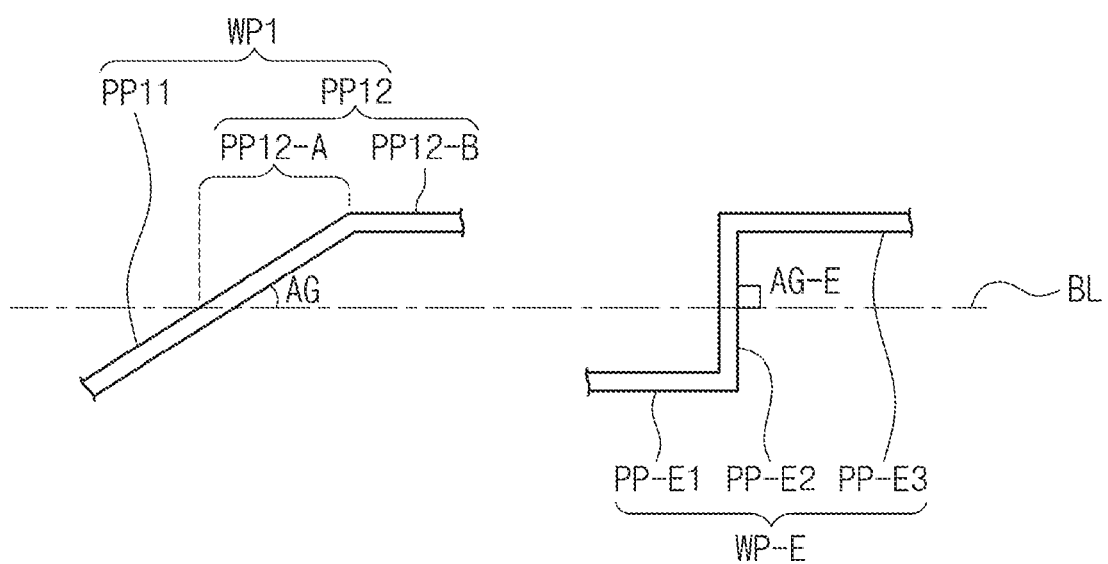
FIG. 4 illustrates a portion of a first driving wiring according to an embodiment of the inventive concept.

FIG. 4 illustrates a portion of the first driving wiring according to an embodiment of the inventive concept. For ease of description, the first driving wiring WP1 and a comparative embodiment WP-E are illustrated together in FIG. 4, and the first driving wiring WP1 illustrates, by way of example, the embodiment illustrated in FIG. 3B.

As illustrated in FIG. 4, the first part PP11 and the second part PP12 of the first driving wiring WP1 may be separated by the border line BL.

The first part PP11 is disposed in the folding area FA (Refer to FIG. 3B). The first part PP11 extends in a diagonal direction with respect to the folding axis FX (refer to FIG. 1), and forms a predetermined angle AG with the border line BL corresponding to the folding axis FX (refer to FIG. 1).

The predetermined angle AG may be smaller than 90 degrees. For example, the predetermined angle AG may be 45 degrees. The predetermined angle AG may be set in various ranges depending on extent of folding of the touch panel 100 (Refer to FIG. 1) and rigidity of the first driving wiring WP1. In the case that the touch panel 100 is folded with a large radius of curvature, or the first driving wiring WP1 is prepared using a matter having a relatively high bending characteristic, the angle AG may be set to be a relatively large angle.

On the contrary, in the case that the touch panel 100 is folded with a small radius of curvature, or the first driving wiring WP1 is prepared using a matter having a relatively low bending characteristic, the angle AG need be set to be a relatively small angle.

The second part PP12 is disposed in the non-folding area. The second part PP12 may include a first section PP12-A and a second section PP12-B which are divided according to an extending direction. The first section PP12-A connects the first part PP11 and the second section PP12-B. The first section PP12-A may extend in various directions.

In this embodiment, the first section PP12-A may extend in a diagonal direction with respect to the first direction DR1. The first section PP12-A may extend in the same direction as that in which the first part PP11 extends. However, this is just an example, and the first section PP12-A may extend in the first direction DR1 or in the second direction DR2 perpendicular to the first direction DR1 in other embodiments.

The second section PP12-B connects the first section PP12-A and the pad PD. The second section PP12-B may extend in the first direction DR1. Accordingly, in the case that the first section PP12-A extends in the diagonal direction with respect to the first direction DR1, an angle formed by the first section PP12-A and the second section PP12-B may be larger than 90 degrees. This angle may be internal angle defined by the first section PP12-A and the second section PP12-B.

The second section PP12-B may extend from the first section PP12-A in the same direction as that in which the first section PP12-A extends. Meanwhile, this is illustrated by way of example, and the second section PP12-B may extend in a direction different from that in which the first section PP12-A extends, or in a direction perpendicular to that in which the folding axis FX extends.

Meanwhile, for the first driving wiring WP1 according to an embodiment of the inventive concept, the first section PP12-A may be omitted, and in this case, the second section PP12-B may also be directly connected to the first part PP11. The second part PP12 of the first driving wiring WP1 according to an embodiment of the inventive concept may be realized as various embodiments, and is not limited to any one embodiment.

The comparative embodiment WP-E includes a first part PP-E1, a second part PP-E2, and a third part PP-E3. The first part PP-E1 and the third part PP-E3 are parallel to the folding axis FX.

The second part PP-E2 connects the first part PP-E1 and the third part PP-E3. The second part PP-E2 extends in a direction forming a second angle AG-E with the folding axis FX. In this embodiment, the second angle AG-E may be substantially 90 degrees.

The folding stress applied as the touch panel 100 (Refer to FIG. 1A) is folded about the folding axis FX occurs in a direction substantially perpendicular to the folding axis FX. Since the border line BL is defined in a direction parallel to the folding axis FX, and thus, the second part PP12 of the first driving wiring WP1, or the first part PP-E1 and the third part PP-E3 of the comparative embodiment WP-E which extend in a direction parallel to the border line BL extend in a direction perpendicular to that in which the folding stress is applied, only a portion of the folding stress is delivered to the first driving wiring WP1. Accordingly, the first driving wiring WP1 may fall under less influence by the folding stress.

On the contrary, since the second part PP-E2 of the comparative embodiment WP-E which extends in a direction perpendicular to the border line BL extends in the same direction as that in which the folding stress is applied, most of the folding stress is delivered to the second part PP-E2. Accordingly, the second part PP-E2 of the comparative embodiment WP-E may fall under significant influence by the folding stress.

For example, in the case that the touch panel is folded so as to have a radius of curvature of about 1 mm, a first angle AG1 of a first driving wiring WP1-R1 may be smaller than 45 degrees. As the angle AG becomes smaller, a rate of wire snapping of the first driving wiring WP1 according to the number of folding may be decreased. Meanwhile, this is described by way of example, and the touch panel may include the first driving wirings WP1 inclined at various angles with respect to the folding axis according to curvature, and is not limited to any one embodiment.

The touch panel according to an embodiment of the inventive concept may reduce the folding stress applied to the first driving wiring WP1 by disposing, in an area corresponding to the folding area FA (Refer to FIG. 2A), the first driving wiring WP1 which extends in the diagonal direction. Accordingly, damage to the first driving wiring caused by the folding stress may be prevented.

Figure 5A:
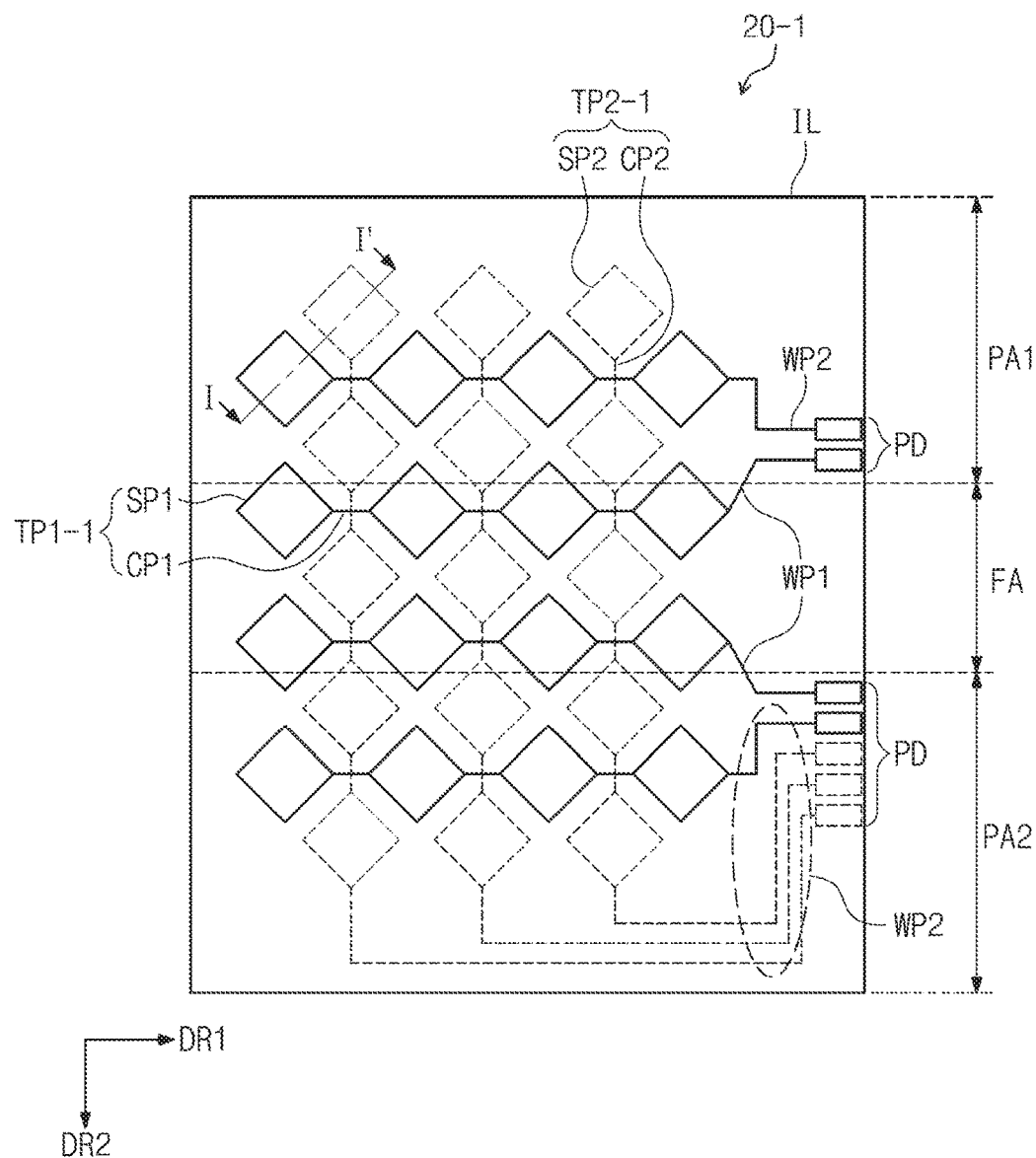
FIG. 5A is a plan view illustrating a touch member according to an embodiment of the inventive concept.
Figure 5B:
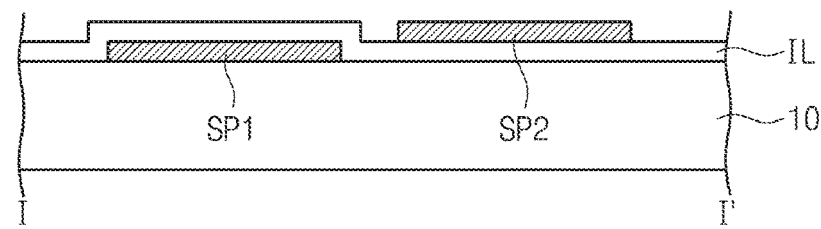
FIG. 5B is a cross-sectional view taken along line I-I' of FIG. 5A.

FIG. 5A is a plan view illustrating a touch member according to an embodiment of the inventive concept. FIG. 5B is a cross-sectional view taken along line I-I' of FIG. 5A. Meanwhile, for the same components as those illustrated in FIGS. 1A to 4, the same reference symbols are assigned and duplicate description is omitted.

As illustrated in FIGS. 5A and 5B, a touch member 20-1 may include a plurality of first touch electrodes TP1-1 and a plurality of second touch electrodes TP2-1. The plurality of first touch electrodes TP1-1 respectively includes a plurality of first sensing patterns SP1 and a plurality of first connecting patterns CP1.

The plurality of first sensing patterns SP1 are arranged to be spaced apart from each other in the first direction DR1. Each of the plurality of first connecting patterns CP1 extends in the first direction DR1 and is disposed between the plurality of first sensing patterns SP1 to connect the adjacent first sensing patterns.

The plurality of second touch electrodes TP2-1 respectively includes a plurality of second sensing patterns SP2 and a plurality of second connecting patterns CP2. The plurality of second sensing patterns SP2 are disposed to be spaced apart from each other in the second direction DR2. Each of the plurality of second connecting patterns CP2 is disposed between the plurality of second sensing patterns SP2 to connect the adjacent second sensing patterns SP2.

The touch member 20-1 may include an insulation layer IL. The insulation layer IL is disposed between the plurality of first touch electrodes TP1-1 and the plurality of second touch electrodes TP2-1 to electrically insulate the plurality of first touch electrodes TP1-1 and the plurality of second touch electrodes TP2-1.

Accordingly, the plurality of first touch electrodes TP1-1 are disposed on a layer different from that on which the plurality of second touch electrodes TP2-1 are disposed, with the insulation layer IL therebetween. A first sensing pattern SP1 and a second sensing pattern SP2 may be disposed to be spaced apart from each other when viewed in a plane. Additionally, a first connecting pattern CP1 and a second connecting pattern CP2 may cross each other while being electrically insulated from each other.

Meanwhile, as described in detail, as the touch member 20-1 may be folded about the folding axis (not illustrated), the folding area FA extends to be defined in the first direction DR1, and the first planar area PA1 and the second planar area PA2 are spaced apart from each other to be defined in the second direction DR2.

The plurality of first touch electrodes TP1-1 which extend in the first direction DR1 are parallel to the folding axis, and the first driving wiring WP1 is connected to any one of the plurality of first touch electrodes TP1-1. As described in detail, at least a part of the first driving wiring WP1 extends in the diagonal direction and overlaps the folding area FA.

The touch panel according to an embodiment of the inventive concept may prevent reliability deterioration caused by the folding stress by modifying shapes of some driving wirings overlapping the folding area FA of a plurality of driving wirings.

In addition, the touch member 20-1 according to an embodiment of the inventive concept modifies a shape of the driving wiring so as to improve a folding characteristic of the touch member 20-1, and the touch cell may use existing structures without any modifications. The touch member 20-1 is not limited to any one touch electrode structure, and may include touch electrodes of various shapes.

Figure 6A:
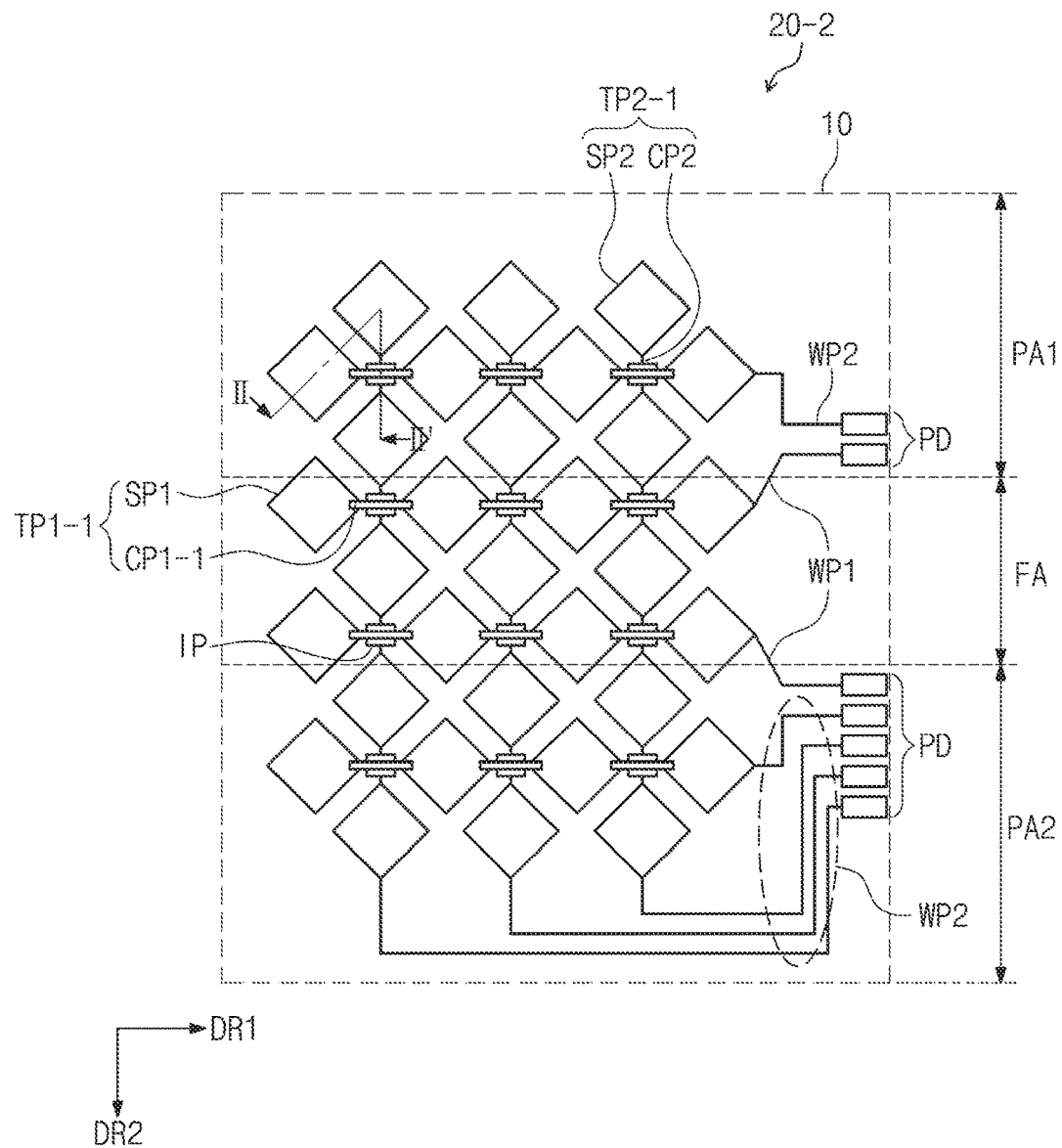
FIG. 6A is a plan view illustrating a touch member according to an embodiment of the inventive concept.
Figure 6B:
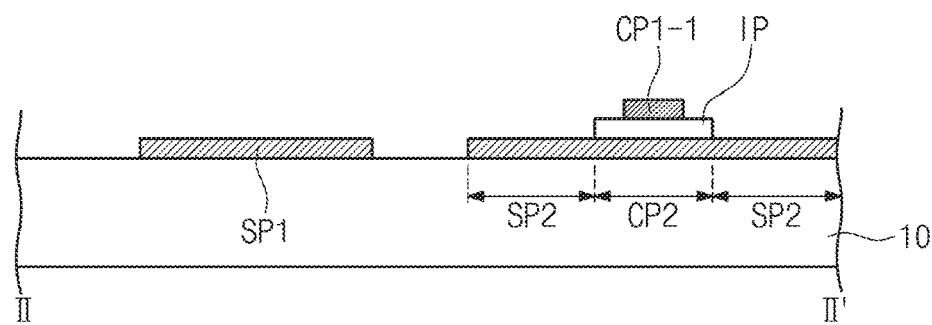
FIG. 6B is a cross-sectional view taken along line II-IF of FIG. 6A.

FIG. 6A is a plan view illustrating a touch member according to an embodiment of the inventive concept. FIG. 6B is a cross-sectional view taken along line II-II' of FIG. 6A. Meanwhile, for the same components as those illustrated in FIGS. 1A to 5B, the same reference symbols are assigned and duplicate description is omitted.

As illustrated in FIGS. 6A and 6B, a touch member 20-2 may include a touch cell disposed in a single layer. Specifically, a plurality of first sensing patterns SP1, a plurality of second sensing patterns SP2, and a plurality of second connecting patterns CP2 may be disposed on the same layer.

In this case, the touch member 20-2 may further include a plurality of insulation patterns IP. A plurality of first connecting patterns CP1-1 may be respectively disposed on the plurality of insulation patterns IP.

The plurality of insulation patterns IP respectively insulate the plurality of first connecting patterns CP1-1 and the plurality of second connecting patterns CP2. The plurality of first connecting patterns CP1-1 respectively cross the plurality of insulation patterns IP to connect first sensing patterns adjacent respectively to the plurality of insulation patterns IP.

In this embodiment, the plurality of driving wirings WP1 and WP2 and the plurality of pads PD may all be disposed on the same layer. The first driving wiring WP1 which extends partly in the diagonal direction, and the second driving wiring WP2 composed of parts perpendicular to each other may be disposed to be adjacent to each other on the same layer. Accordingly, the touch member 20-2 according to an embodiment of the inventive concept may be realized as a thin film touch panel.

Meanwhile, even though not illustrated, a part of the plurality of pads PD may be disposed on a different layer. In this case, since each of the plurality of pads PD is insulated from each other, pads disposed on different layers may overlap each other when viewed in a plane. Accordingly, an area of the non-active area NAR (refer to FIG. 1A) of the touch member 20-2 may be reduced.

Figure 7A:
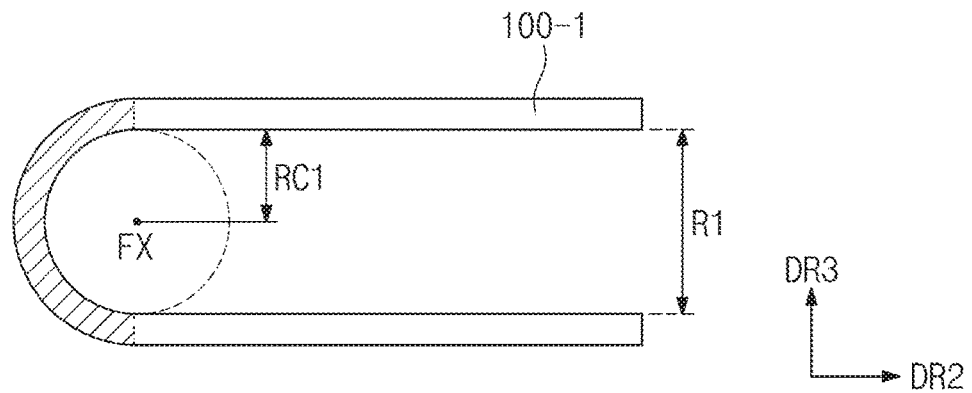
FIG. 7A is a cross-sectional view illustrating an embodiment of a touch panel according to an embodiment of the inventive concept.
Figure 7B:
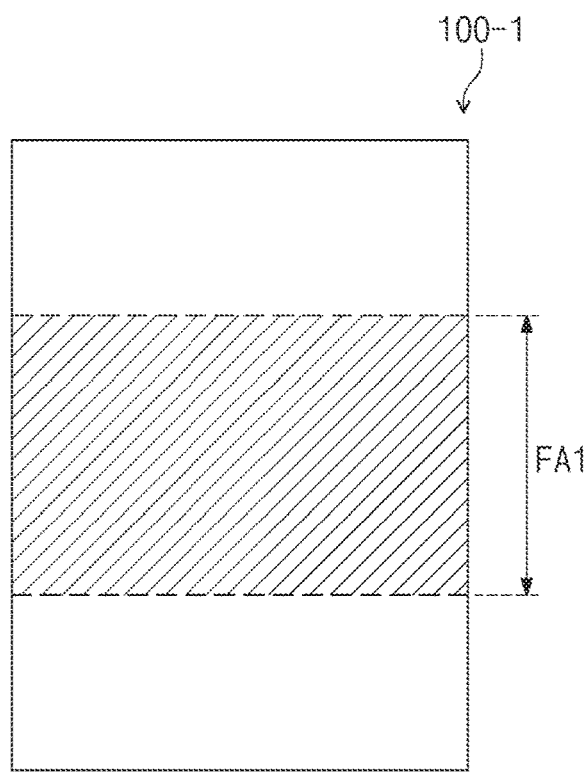
FIG. 7B is a plan view schematically illustrating the touch panel corresponding to FIG. 7A.
Figure 8A:
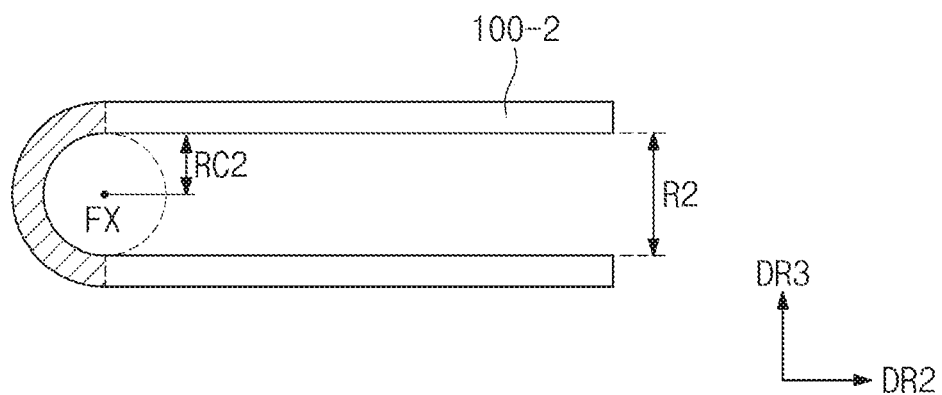
FIG. 8A is a cross-sectional view illustrating an embodiment of a touch panel according to an embodiment of the inventive concept.
Figure 8B:
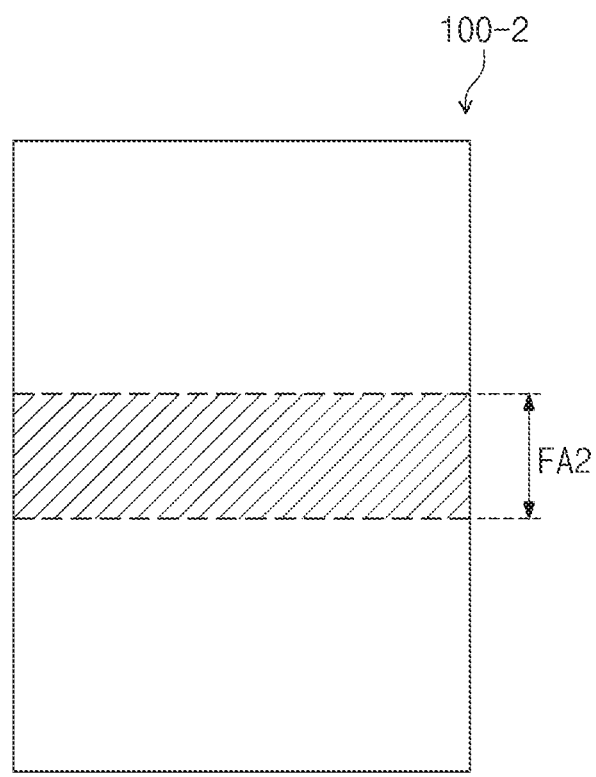
FIG. 8B is a plan view schematically illustrating the touch panel corresponding to FIG. 8A.
Figure 9:
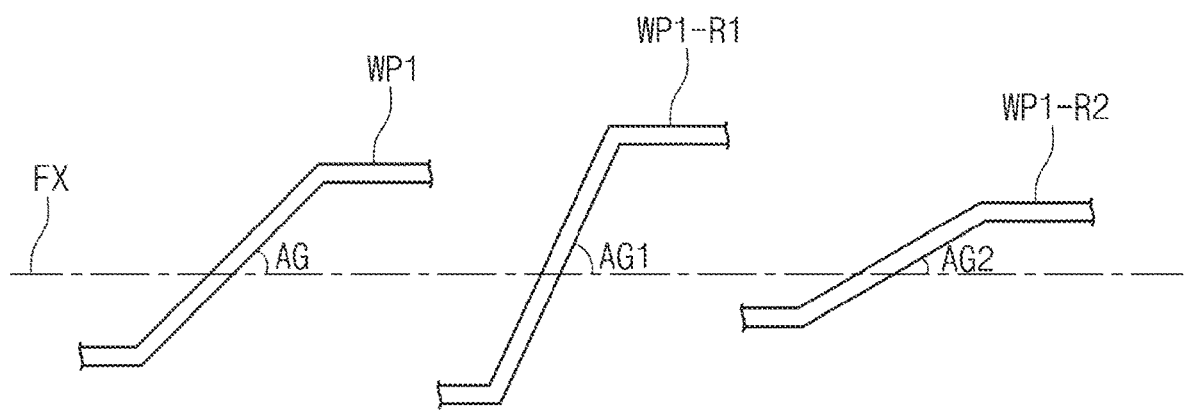
FIG. 9 is a partial plan view partially illustrating first driving wirings according to an embodiment of the inventive concept.

FIG. 7A is a cross-sectional view illustrating an embodiment of a touch panel according to an embodiment of the inventive concept. FIG. 7B is a plan view schematically illustrating the touch panel corresponding to FIG. 7A. FIG. 8A is a cross-sectional view illustrating an embodiment of a touch panel according to an embodiment of the inventive concept. FIG. 8B is a plan view schematically illustrating the touch panel corresponding to FIG. 8A. FIG. 9 is a partial plan view partially illustrating first driving wirings according to an embodiment of the inventive concept.

As illustrated in FIGS. 7A and 7B, when a touch panel 100-1 is folded with respect to the folding axis FX so as to have a first radius of curvature RC1, a first folding area FA1 may be defined in the touch panel 100-1. The first radius of curvature RC1 may be larger than the radius of curvature RC illustrated in FIG. 2B. In this case, a distance between ends of the folded touch panel 100-1 may be defined as a first distance R1.

The first folding area FA1 may have a first width in the second direction DR2. Referring to FIG. 7A, the first width may be r times the first radius of curvature RC1.

As illustrated in FIGS. 8A and 8B, when a touch panel 100-2 is folded with respect to the folding axis FX so as to have a second radius of curvature RC2, a second folding area FA2 may be defined in the touch panel 100-2. The second radius of curvature RC2 may be smaller than the radius of curvature RC illustrated in FIG. 2B. In this case, a distance between ends of the folded touch panel 100-2 may be defined as a second distance R2.

The second folding area FA2 may have a second width in the second direction DR2. As described in detail, the second width may be r times the second radius of curvature RC2.

Meanwhile, referring to FIGS. 7A to 8B, as the touch panel is folded so as to have a smaller radius of curvature, a distance between ends of the folded touch panel becomes shorter. At this time, the folding stress applied to the touch panel becomes larger in the touch panel folded so as to have the smaller radius of curvature.

Meanwhile, as the touch panel is folded so as to have a smaller radius of curvature, a width of the folding area in the second direction DR2 becomes smaller. Accordingly, the width of the first folding area FA1 in the second direction DR2 may be larger than the width of the second folding area FA2 in the second direction DR2. On the contrary, the strength of the folding stress applied to the first folding area FA1 may be smaller than the strength of the folding stress applied to the second folding area FA2.

In FIG. 9, for ease of description, the first driving wiring WP1 of the touch panel illustrated in FIG. 2B, the first driving wiring WP1-R1 overlapping the first folding area FA1, and a first driving wiring WP1-R2 overlapping the second folding area FA2 are compared.

In this embodiment, for ease of description, for each of the first driving wirings WP1, WP1-R1, and WP1-R2, parts which extend in the same directions as parts disposed in the folding area are illustrated to be also disposed in the non-folding area. Accordingly, for each of the first driving wirings WP1, WP1-R1, and WP1-R2, angles formed with the folding axis FX are shown as AG, AG1, and AG2, respectively.

As illustrated in FIG. 9, the first angle AG1 at which the first driving wiring WP1-R1 is inclined with respect to the folding axis FX may be larger than the angle AG of the first driving wiring WP1. As described in detail, since the folding stress decreases as the touch panel is folded with a relatively large radius of curvature, damage caused by the folding stress may become less even when extent of inclination of the first driving wiring with respect to the folding axis FX is small.

On the contrary, the second angle AG2 at which the first driving wiring WP1-R2 is inclined with respect to the folding axis FX may be smaller than the angle AG of the first driving wiring WP1. As described in detail, since the folding stress increases as the touch panel is folded with a relatively small radius of curvature, damage caused by the folding stress may become less only when extent of inclination of the first driving wiring with respect to the folding axis FX is large.

Meanwhile, referring to FIG. 7B, the width of the first folding area FA1 which experiences the folding stress becomes larger than a width of the folding area FA in FIG. 2B. Accordingly, the touch panel 100-1 may include a larger number of the first driving wirings WP1-R1.

Referring to FIG. 8B, the width of the second folding area FA2 which is influenced by the folding stress becomes smaller than the width of the folding area FA in FIG. 2B. Accordingly, the touch panel 100-2 may have improved reliability also by including a smaller number of the first driving wirings WP1-R2.

According to an embodiment of the inventive concept, by controlling the extent of inclination of the driving wiring, or adjusting the number of driving wirings overlapping the folding area according to extent of folding of the touch panel, the folding stress may be alleviated. Accordingly, a touch panel with improved reliability may be provided even without changing shape of material, or further including a separate reinforcing member.

Figure 10A:
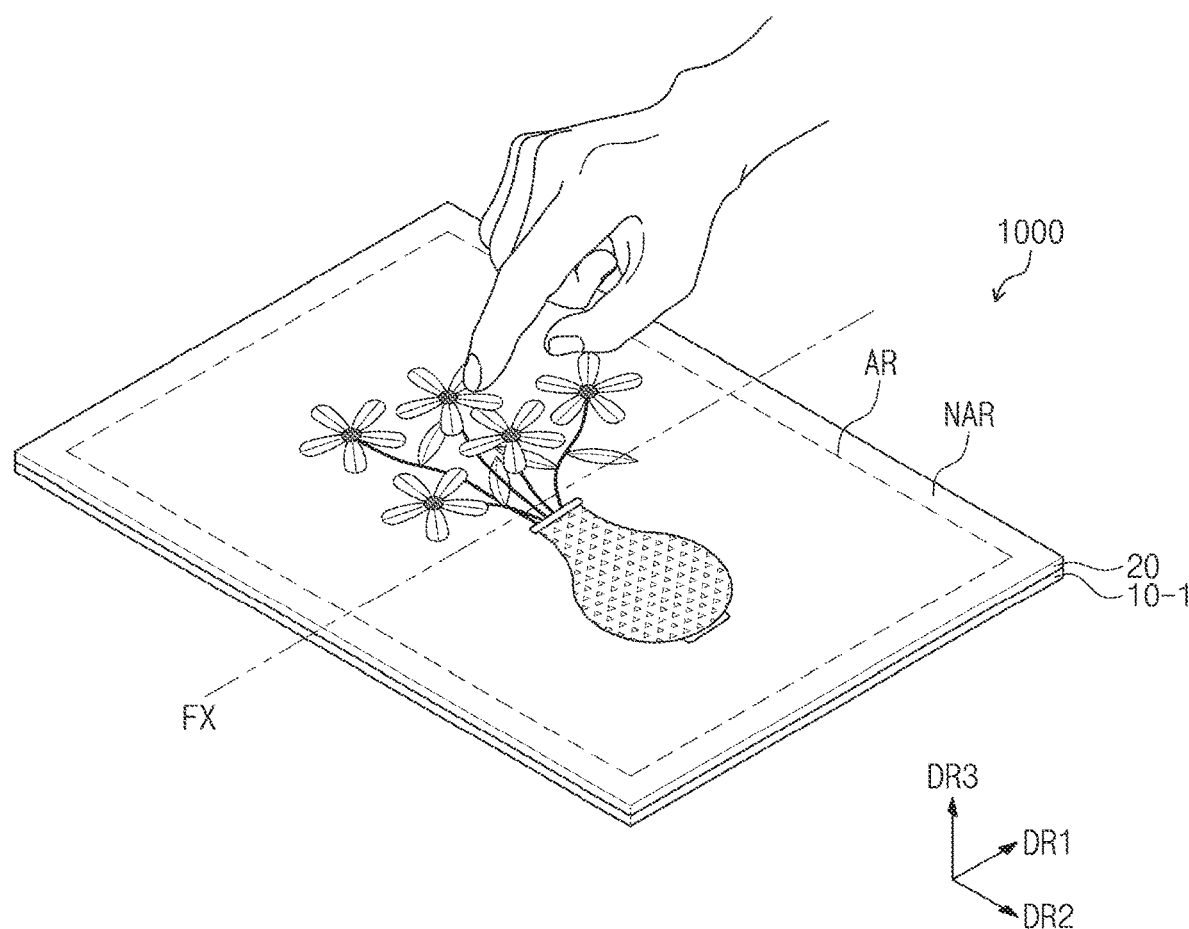
FIG. 10A is a perspective view illustrating a touch screen panel according to an embodiment of the inventive concept.
Figure 10B:
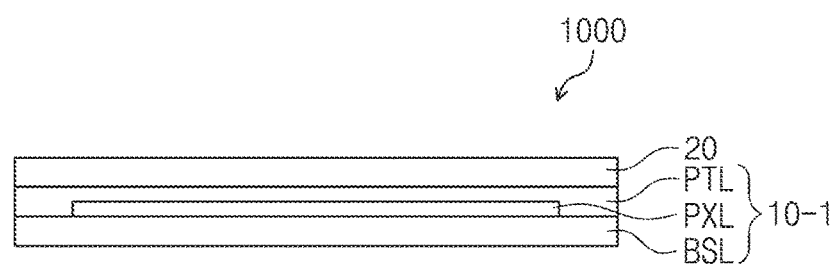
FIG. 10B is a cross-sectional view illustrating a touch screen panel according to an embodiment of the inventive concept.

FIG. 10A is a perspective view illustrating a touch screen panel according to an embodiment of the inventive concept. FIG. 10B is a cross-sectional view illustrating a touch screen panel according to an embodiment of the inventive concept. As illustrated in FIGS. 10A and 10B, a touch screen panel 1000 may include a display member 10-1 and the touch panel 20. The touch panel 20 may correspond to the touch panel 20 illustrated in FIG. 1, and thus description thereof is omitted.

The display member 10-1 may have properties of flexibility so as to be capable of being folded about the folding axis FX. The touch panel 20 and the display member 10-1 are all folded about the folding axis FX.

The display member 10-1 includes a base layer BSL, a pixel layer PXL, and a protection layer PTL. The base layer BSL may be an insulation layer, or an insulation substrate. For example, the base layer BSL may be a plastic substrate, a glass substrate, or a silicon substrate.

The pixel layer PXL is disposed on the base layer BSL. The pixel layer PXL includes a plurality of pixels. The plurality of pixels are activated when an electrical signal is applied, and realize an image corresponding to the electrical signal.

The pixel layer PXL may include a plurality of organic light-emitting devices, a liquid crystal layer, an electrophoretic layer, or an electrowetting layer. In this embodiment, for ease of description, a pixel layer PXL in which an organic light-emitting device is disposed is illustrated by way of example.

The protection layer PTL is disposed on the pixel layer PXL. The protection layer PTL protects the pixel layer PXL from outside environment. The protection layer PTL may include a plurality of organic layers and/or inorganic layers.

Meanwhile, this is described by way of example, and the protection layer PTL may also be an insulation substrate. The protection layer PTL may include various embodiments, and is not limited to one embodiment.

The touch member 20 may be directly disposed on the protection layer PTL. Or, even though not illustrated, the touch member 20 may also be disposed beneath the base layer BSL, or inside the display member 10-1. The touch member 20 may correspond to the touch member 20 of FIG. 1, and duplicate description is omitted.

The touch screen panel 1000 according to an embodiment of the inventive concept may function as a foldable device which may be driven by touch as well as provides an image to a user. Even though not illustrated, driving wirings, among various driving wirings for driving the display member 10-1, disposed in an area overlapping a folding area may extend in a direction inclined with respect to the folding axis FX. Accordingly, the touch screen panel 1000 may simultaneously improve reliability of each of the display member 10-1 and the touch member 20.

Although the exemplary embodiments of the inventive concept have been described herein, it is understood that various changes and modifications can be made by those skilled in the art within the spirit and scope of the inventive concept defined by the following claims or the equivalents.

Therefore, the scope of the inventive concept is defined by the following claims or the equivalents rather than the foregoing detailed description.

What is claimed is:

1. A touch panel comprising:
   a base member having a bending area which is bended around a bending axis and a non-bending area adjacent to the bending area, the bending axis extending in a first direction
   a touch cell which senses an external touch signal, and wherein at least a part of the touch cell overlaps the bending area;
   a pad disposed on the base member, and spaced apart from the touch cell when viewed in a plane; and
   a first driving wiring overlapping the bending area and connecting the pad and the touch cell,
   wherein a part disposed at the bending area of the first driving wiring extends in a diagonal direction with respect to the bending axis.

2. The touch panel of claim 1, wherein the pad is disposed in the non-bending area.

3. The touch panel of claim 2, wherein the first driving wiring comprises:
   a first part disposed in the bending area and extending in the diagonal direction with respect to the first direction; and
   a second part connected to the first part, and disposed in the non-bending area.

4. The touch panel of claim 3, wherein an angle formed by the first part and the second part is greater than 90 degrees.

5. The touch panel of claim 4, wherein the first part is inclined with respect to the first direction at an angle that is no greater than 45 degrees.

6. The touch panel of claim 3, wherein the second part comprises:
   a first section connected to the first part, and configured to extend in a diagonal direction with respect to the first direction; and
   a second section configured to connect the first section and the pad, and to extend in the first direction.

7. The touch panel of claim 6, wherein the first section extends in the same direction as that in which the first part extends.

8. The touch panel of claim 1, further comprising a second driving wiring connected to the touch cell, and disposed in the non-bending area,
   wherein the second driving wiring overlaps the non-bending area.

9. The touch panel of claim 8, wherein:
   the pad, the first driving wiring, and the second driving wiring are each provided in plurality;
   the plurality of first driving wirings and the plurality of second driving wirings are respectively connected to a corresponding pad of the plurality of pads; and
   the plurality of pads overlap the non-bending area.

10. The touch panel of claim 9, wherein each of the plurality of second driving wirings comprises:
    a first part connected to the touch cell;
    a second part connected to the first part; and
    a third part configured to connect a corresponding pad of the plurality of pads and the second part,
    wherein one of the first part and the second part is parallel to the bending axis, and the first part and the second part are perpendicular to each other.

11. The touch panel of claim 9, wherein the touch cell comprises:
    a plurality of first electrodes configured to extend in the first direction, and arranged in a second direction crossing the first direction; and
    a plurality of second electrodes that crosses the plurality of first electrodes at crossing points, the second electrodes being electrically insulated from the first electrodes at the crossing points;
    wherein
    each of the plurality of first driving wirings is connected to a corresponding electrode of the plurality of first electrodes, and
    each of the plurality of second driving wirings is connected to a corresponding electrode among the plurality of first electrodes and the plurality of second electrodes.

12. The touch panel of claim 11, wherein each of the plurality of second driving wirings is disposed on the same layer.

13. The touch panel of claim 11, wherein second driving wirings connected to the plurality of first electrodes, and second driving wirings connected to the plurality of second electrodes, among the plurality of second driving wirings, are disposed on different layers from each other.

14. A display device comprising:
a display panel which comprises a plurality of pixels, and is divided into a bending area which is bended about a bending axis defined in a first direction, and a non-bending area adjacent to the bending area; and
a touch member which is disposed on the display panel and which senses an external touch input,
wherein the touch member comprises:
a plurality of touch electrodes disposed in the bending area,
a plurality of pads disposed in the non-bending area, and
a plurality of driving wirings having a first driving wiring which connects a corresponding touch electrode of the plurality of touch electrodes and a corresponding pad of the plurality of pads, and at least a part of which extends in a diagonal direction with respect to the first direction in the bending area, and a second driving wiring disposed in the non-bending area,
wherein the second driving wiring comprises a first part connected to a corresponding touch electrode of the plurality of touch electrodes, a second part connected the first part, and a third part connected to a corresponding pad of the plurality of pads and the second part, and wherein one of the first part and the second part is parallel to the bending axis, and the first part and the second part are perpendicular to each other.

15. The display device of claim 14, wherein the plurality of touch electrodes comprises:
a plurality of first electrodes configured to extend in the first direction, and arranged in a second direction crossing the first direction; and
a plurality of second electrodes that crosses each of the plurality of first electrodes at crossing points, the second electrodes being electrically insulated from the first electrodes at the crossing points;
wherein
each of the first driving wiring and the second driving wiring is provided in plurality,
each of the plurality of first driving wirings is connected to one of the plurality of first electrodes, and
each of the plurality of second driving wirings is connected to one among the plurality of first electrodes and the plurality of second electrodes.

16. The display device of claim 15, wherein the first driving wiring comprises:
a first part overlapping the bending area, and connected to one of the plurality of first electrodes; and
a second part disposed in the non-bending area, and connected to the first part,
wherein the first part extends in a direction having an angle that is no greater than 45 degrees with respect to the first direction.

17. The display device of claim 16, wherein the plurality of pads are arranged in the second direction, and do not overlap the bending area.

18. The display device of claim 15, wherein the display panel further comprises an encapsulation layer disposed on the plurality of pixels,
wherein at least one of the plurality of first electrodes and the plurality of second electrodes is directly disposed on the encapsulation layer.

19. The display device of claim 15, wherein the display panel further comprises an insulation substrate disposed on the plurality of pixels,
wherein at least one of the plurality of first electrodes and the plurality of second electrodes is directly disposed on the insulation substrate.

* * * * *